D. B. SHEPP.
ALARM.
APPLICATION FILED APR. 24, 1917.

1,240,889.

Patented Sept. 25, 1917.

WITNESS
F. J. Hartman.

INVENTOR
Daniel B. Shepp.

BY

ATTORNEYS

UNITED STATES PATENT OFFICE.

DANIEL B. SHEPP, OF PHILADELPHIA, PENNSYLVANIA.

ALARM.

1,240,889.  Specification of Letters Patent.  Patented Sept. 25, 1917.

Application filed April 24, 1917. Serial No. 164,091.

*To all whom it may concern:*

Be it known that I, DANIEL B. SHEPP, a citizen of the United States, and a resident of Philadelphia, county of Philadelphia, State of Pennsylvania, have invented certain new and useful Improvements in Alarms, of which the following is a specification, reference being had to the accompanying drawing.

My invention relates to alarm devices for attachment to revolving or rotating bodies, such as the wheels of vehicles, for the purpose of giving warning of the approach or proximity of the vehicle, and also for attachment to fly wheels or shafts of machinery or the like, for the purpose of warning any one approaching the machinery of his proximity thereto. A principal object of my invention is to provide an alarm suitable for the purposes intended which shall be simple in construction, cheap to manufacture, easy to attach to the revolving body in connection with which it is intended to operate and effective in operation. Further objects of my invention are to provide an alarm embodying the foregoing characteristics adapted to operate satisfactorily when rotated either at relatively high or relatively low speed, or at any intermediate speed; which will not be liable to get out of order through use or careless handling, and which in operation shall give off a noise of unobjectionable and, in fact, of pleasing character, sufficient, however, to effect the desired warning.

Figure 1:
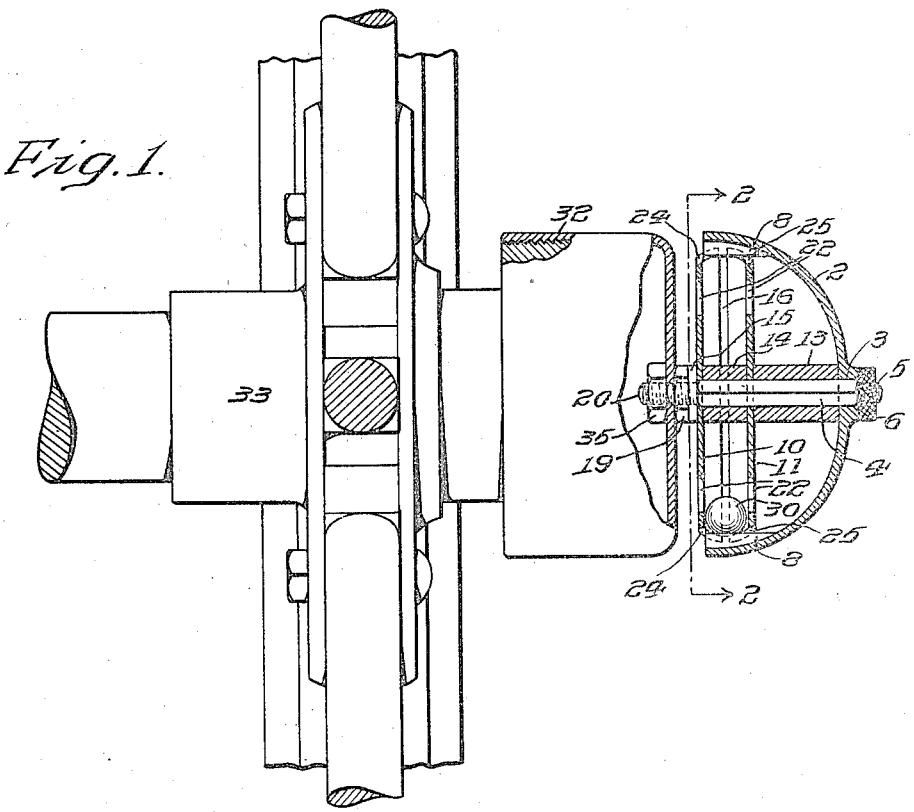
Figure 2:
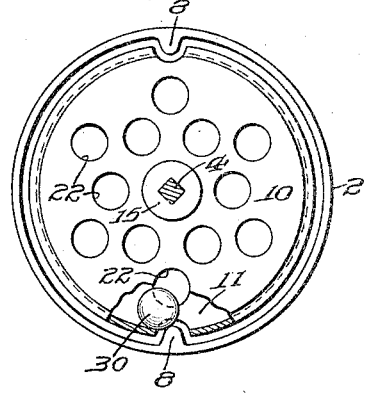

In the accompanying drawing, in which I have shown one embodiment of my invention attached to the hub cap of a vehicle wheel, not intending thereby, however, to limit the use of the invention solely in connection with vehicles, for, as hitherto stated, the invention is equally adapted for use in connection with any suitable rotating or revolving body or instrumentality, Figure 1 is a view of such embodiment of the invention in central vertical section, the hub cap of the vehicle wheel being also partially shown in similar section and partially in elevation together with a fragmentary portion of the wheel and hub, and Fig. 2 is a view taken on line 2—2 in Fig. 1, looking in the direction of the arrows, certain parts, however, being broken away for the sake of clearness.

The form of the invention shown in the drawing comprises a preferably substantially dome-shaped vibratile member or bell 2 open at its base and provided at its apex with a squared aperture 3 adapted to engage a squared spindle 4 upon which the bell is supported, the outer end of the spindle being externally threaded as at 5 to receive a suitable thumb nut 6 to maintain the bell on the spindle. It will be understood that the vibratile member is preferably formed of bell metal or other material adapted to give off a suitable sound when struck by a striking member as hereinafter described, and is provided adjacent its base with one or more inwardly projecting integral lugs 8, two lugs diametrically positioned with respect to the bell being shown in the drawing, although a greater or less number of lugs may be utilized as desired.

Operatively fixedly supported on the spindle 4 is a pair of preferably similar disks 10, 11, each having a squared central aperture through which the spindle is arranged to pass and a peripheral flange turned up from the body of the disk thereby forming a sort of shallow cup, so that when the disks are arranged on the spindle with their respective flanges directed toward each other they will form a sort of cage, the diameter of the disks being preferably sufficient to bring the flanges adjacent to the wall of the vibratile member, but not in contact therewith. For the purpose of maintaining the disks in proper relatively spaced relation and also of maintaining the bell in properly spaced relation with the disks, a plurality of spacing sleeves 13, 14 are provided, each having a central aperture to receive the spindle 4, the length of the sleeve 13 being such that the two disks are held sufficiently spaced apart to prevent the adjacent edges of the flanges from coming into contact, thereby forming an annular groove or space 16 between the flanges, and the length of sleeve 14 being such that the bell, when the parts are assembled, is preferably held in such position that its lower edge lies in the plane, or substantially in the plane, of disk 10 so that the cage is substantially contained within the bell. A sleeve 15, preferably much shorter than either of the other sleeves, is positioned against the outer surface of disk 10 and forms a sort of washer against which a nut 19 is adapted to be screwed over the projecting threaded inner end 20 of the spindle to maintain the various parts hitherto described in operatively assembled relation.

Each of the disks 10 and 11 are preferably provided with a plurality of circular perforations 22 and are also respectively notched as at 24, 25 adjacent lugs 8, so that the latter, while entirely out of contact therewith, can project very slightly within the margins of the two oppositely disposed disks forming the cage, within which is loosely positioned a striking member, preferably a ball 30, of slightly less diameter than the distance between the adjacent faces of the disks so that it shall be freely movable within the cage.

The various parts having been constructed and assembled preferably substantially as hereinbefore described, the invention may be attached to any suitable rotating or revolving element in any suitable or convenient manner so that it will turn with the element. For example, and as shown in the drawing, the invention may be attached to the hub cap 32 of a vehicle wheel positioned on the hub 33 thereof, by forming a suitable aperture in the cap, passing the threaded end 20 of the spindle therethrough and securing the spindle in fixed relation with the cap by one or more lock nuts 35, it being understood, of course, that the axle of the spindle 4 is preferably coincident with the axis of the wheel. With the invention so attached it will be evident that when the wheel revolves the spindle 4 will also rotate carrying with it the bell 2 and disks 10 and 11 while the ball, through the action of gravity or other forces, will tend to remain at substantially the lowest point in the cage so that as the bell revolves the lugs 8 will be successively brought into contact with the ball with sufficient impact to cause the bell to vibrate and give off a substantially continuous sound, thereby warning a bystander of the proximity of the revolving member to which the invention is attached. It will further be evident that owing to the groove or space 16 between the flanged disks and also by reason of the perforations 22 therein, any dust or dirt which might enter the cage when the invention is attached to, for example an automobile or other vehicle, may readily escape therefrom without impeding the movement of the ball, and further that the perforations in the disks prevent any muffling or subduing of the sound caused by the vibration of the bell as heretofore described.

While I have herein described one embodiment of my invention with considerable particularity and have shown it in combination with a wheel of an automobile, I do not thereby desire or intend to limit myself to the specific features and details of construction and arrangement which I have shown and described, or to its use solely in combination with the wheels of automobiles or other vehicles, as suitable changes and modifications may be made in the form and arrangement of the several parts of the invention as desired, and the invention may be used in connection with any suitable revolving or rotating element or instrumentality and attached thereto in any desired position without departing from the spirit and scope of the invention as defined in the appended claims.

Having thus described my invention, I claim and desire to protect by Letters Patent of the United States:—

1. An alarm device comprising a vibratile member, a cage concentric and in fixed operative relation with said member and means in said cage operative to vibrate said member independent of the speed of rotation thereof when said member and said cage are rotated on their common center.

2. An alarm device comprising a vibratile member, a spindle supporting said member, a cage mounted on said spindle and a freely movable body confined within said cage operative to vibrate said member when said spindle is rotated about its longitudinal axis independent of the speed of such rotation.

3. An alarm comprising a vibratile member, a spindle supporting said member, a cage comprising a pair of spaced disks mounted on said spindle and substantially contained within and out of contact with said member, and means comprising a body freely movable within said cage operative to vibrate said member when said member and said cage are rotated.

4. An alarm device comprising a vibratile member having an integral lug, a cage maintained in fixed operative relation with said member and a body freely movable within said cage, said lug being arranged to project within said cage to contact with said freely movable member when said cage and said vibratory member are rotated.

5. An alarm device comprising a vibratile member having an integral inwardly extending lug, a spindle supporting said member, a cage in fixed relation with said spindle comprising a pair of spaced disks and a ball freely movable within said cage adapted to contact with said lug when said spindle is revolved.

6. An alarm device comprising a vibratile member, a spindle supporting said member, a cage in fixed relation with said member and said spindle and comprising a pair of oppositely disposed flanged plates relatively spaced and out of contact with each other and with said member, a ball freely movable in said cage, a lug integral with said member and projecting within said cage and means operative to maintain said spindle in fixed relation with a rotatable element.

7. The combination with a rotatable element, of an alarm comprising a vibratile substantially dome-shaped member, a spindle supporting said member, a cage mounted on said spindle and substantially within said member comprising a pair of opposed spaced perforated disks having oppositely disposed spaced peripheral flanges, a ball freely movable within said cage, a lug integral with said vibratory member projecting into and out of contact with said cage and means to maintain said spindle in fixed operative relation with said element whereby the rotation of said element will cause said ball to impinge against said lug to vibrate said member.

In witness whereof I have hereunto set my hand this 18th day of April, A. D., 1917.

DANIEL B. SHEPP.

Copies of this patent may be obtained for five cents each, by addressing the "Commissioner of Patents, Washington, D. C."

Correction in Letters Patent No. 1,240,889.

It is hereby certified that in Letters Patent No. 1,240,889, granted September 25, 1917, upon the application of Daniel B. Shepp, of Philadelphia, Pennsylvania, for an improvement in "Alarms," an error appears in the printed specification requiring correction as follows: Page 2, line 26, for the word "axle" read *axis;* and that the said Letters Patent should be read with this correction therein that the same may conform to the record of the case in the Patent Office.

Signed and sealed this 20th day of November, A. D., 1917.

[SEAL.]                          R. F. WHITEHEAD,

*Acting Commissioner of Patents.*

Cl. 116—9.